(12) United States Patent
Ozawa

(10) Patent No.: US 9,482,110 B2
(45) Date of Patent: Nov. 1, 2016

(54) POWER GENERATION SYSTEM AND METHOD OF STOPPING POWER GENERATION SYSTEM

(71) Applicant: MITSUBISHI HITACHI POWER SYSTEMS, LTD., Nishi-ku, Yokohama (JP)

(72) Inventor: Hiroyuki Ozawa, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 400 days.

(21) Appl. No.: 14/140,385

(22) Filed: Dec. 24, 2013

(65) Prior Publication Data

US 2014/0190173 A1 Jul. 10, 2014

(30) Foreign Application Priority Data

Dec. 25, 2012 (JP) ................. 2012-281470

(51) Int. Cl.
*F01D 21/00* (2006.01)
*F02C 9/00* (2006.01)
*F02C 3/14* (2006.01)

(52) U.S. Cl.
CPC ............... *F01D 21/00* (2013.01); *F02C 3/14* (2013.01); *F02C 9/00* (2013.01); *H01M 2250/20* (2013.01); *H01M 2250/402* (2013.01); *Y02E 20/16* (2013.01)

(58) Field of Classification Search
CPC .......... F01D 21/00; F02C 9/00; Y02E 20/16; H01M 2250/20; H01M 2250/402
USPC ............................ 60/773, 780, 783, 793, 801
See application file for complete search history.

(56) References Cited

U.S. PATENT DOCUMENTS

| 5,449,568 | A | 9/1995 | Micheli et al. |
| 6,077,620 | A * | 6/2000 | Pettit ............... B01J 8/0438 |
| | | | 429/425 |
| 2005/0019620 | A1* | 1/2005 | Schick ............... F02C 3/20 |
| | | | 60/39.182 |

(Continued)

FOREIGN PATENT DOCUMENTS

| JP | 7-245117 A | 9/1995 |
| JP | 11-214021 A | 8/1999 |
| JP | 11-297336 A | 10/1999 |

(Continued)

OTHER PUBLICATIONS

Decision of a Patent Grant mailed May 26, 2015, corresponding to Japanese patent application No. 2012-281470.

(Continued)

*Primary Examiner* — Steven Sutherland
(74) *Attorney, Agent, or Firm* — Hauptman Ham, LLP

(57) ABSTRACT

A gas turbine including a compressor and a combustor, an SOFC including an air electrode (cathode) and a fuel electrode (anode), a first compressed air supply line adapted to supply a compressed air compressed by the compressor to the combustor, a second compressed air gas supply line adapted to supply a part of a compressed air compressed by the compressor to the air electrode (cathode), a first fuel gas supply line adapted to supply a fuel gas to the combustor, a second fuel gas supply line adapted to supply a fuel gas to the fuel electrode (anode), a fuel gas recirculation line adapted to return an exhausted fuel gas discharged from the fuel electrode (anode) to the fuel electrode (anode), a cooler provided in the fuel gas recirculation line are provided.

8 Claims, 6 Drawing Sheets

(56) References Cited

U.S. PATENT DOCUMENTS

| | | | |
|---|---|---|---|
| 2006/0010866 A1* | 1/2006 | Rehg | F02C 6/10 60/641.8 |
| 2008/0070078 A1* | 3/2008 | Gummalla | B64D 41/00 429/410 |

FOREIGN PATENT DOCUMENTS

| | | |
|---|---|---|
| JP | 2000-133295 A | 5/2000 |
| JP | 2001-158602 A | 6/2001 |
| JP | 2004-206896 A | 7/2004 |
| JP | 2007-95686 A | 4/2007 |
| JP | 2009-238618 A | 10/2009 |
| JP | 2012-174673 A | 9/2012 |
| JP | 2012-227064 A | 11/2012 |

OTHER PUBLICATIONS

Office Action mailed Jan. 6, 2015, corresponding to Japanese patent application No. 2012-281470.
Office Action mailed Mar. 10, 2015, corresponding to Japanese patent application No. 2012-281470.

* cited by examiner

POWER GENERATION SYSTEM AND METHOD OF STOPPING POWER GENERATION SYSTEM

RELATED APPLICATIONS

The present application claims priority to Japanese Application No. 2012-281470, filed Dec. 25, 2012, the disclosure of which is hereby incorporated by reference herein in its entirety.

FIELD

The present invention relates to a power generation system constituted by a combination of a fuel cell, a gas turbine, and a steam turbine, and a method of stopping a power generation system.

BACKGROUND

A solid oxide fuel cell (hereinafter, referred to as SOFC) is known as a versatile highly efficient fuel cell. Since, in the SOFC, the operation temperature is set high in order to enhance the ion conductivity, the SOFC can use the air discharged from a compressor of a gas turbine as an air (oxidant) to be supplied to an air electrode (cathode). In addition, an unused high-temperature fuel and waste heat exhausted from the SOFC can be used as fuel and an oxidant in the combustor of the gas turbine. Further, other than the SOFC, a molten carbonate fuel cell is known as a fuel cell having a high operation temperature, and, similarly to the SOFC, the use of waste heat thereof in cooperation with a gas turbine has been examined.

Therefore, for example, as disclosed in Patent Literatures 1 to 3, various power generation systems constituted by combinations of an SOFC, a gas turbine, and a steam turbine have been proposed as a power generation system capable of achieving highly efficient power generation. A SOFC power generation facility disclosed in Patent Literature 1 is provided with a heating side of a cathode heat exchanger, a cooler, and a recycle blower in a cathode recycle line, cools a cathode gas having passed through the fuel cell with the cathode heat exchanger and the cooler, and recirculates the gas in the cathode gas line. Further, a hybrid power generation system disclosed in Patent Literature 2 is provided with an exhausted fuel recirculation blower that supplies a part of the fuel to a hydrogen fuel to be supplied to a fuel cell, and a heat exchanger for fuel that heats the fuel by a recirculating fuel. In addition, the SOFC hybrid power generation plant system disclosed in Patent Literature 3 is provided with a heat exchanger for heating fuel that heats fuel in a fuel supply line by an exhausted fuel in the exhaust fuel line.

CITATION LIST

Patent Literature

Patent Literature 1: Japanese Laid-open Patent Publication No. 11-214021
Patent Literature 2: Japanese Laid-open Patent Publication No. 11-297336
Patent Literature 3: Japanese Laid-open Patent Publication No. 2000-133295

SUMMARY

Technical Problem

In the above-described power generation system, there may be a case in which only the SOFC is stopped for reasons of a decrease in necessary load, or an inspection of the SOFC, under a state in which the gas turbine and the SOFC are operated to perform power generation. Since the operating temperature of SOFC becomes high at the power generation, it is desirable to promptly cool the SOFC when an inspection needs to be conducted early. However, in the power generation system, when only the SOFC is stopped and is separated from the gas turbine, supply of compressed air from a compressor is stopped, and therefore, there is a problem that it takes a long time to cool the SOFC. Similarly, when the gas turbine and the SOFC are stopped at the same time, supply of the compressed air from the gas turbine is stopped, and similarly, there is a problem that it takes a long time to cool the SOFC. Further, a method can be considered, which reduces the operation temperature of the SOFC and stops the SOFC under a state in which the SOFC and the gas turbine are operated in cooperation with each other. However, the temperature of the compressed air supplied through an outlet of the compressor is usually about 300 to 450° C., and therefore, the SOFC cannot be cooled lower than that temperature.

The present invention is to solve the above-described problems, and an objective is to provide a power generation system and a method of stopping a power generation system capable of promptly cooling the fuel cell when stopping the fuel cell.

Solution to Problem

According to an aspect of the present invention, a power generation system includes: a gas turbine including a compressor and a combustor; a fuel cell including an air electrode (cathode) and a fuel electrode (anode); a first compressed oxidant supply line adapted to supply a compressed oxidant compressed by the compressor to the combustor; a second compressed oxidant supply line adapted to supply a part of the compressed oxidant compressed by the compressor to the air electrode (cathode); a first fuel gas supply line adapted to supply a fuel gas to the combustor; a second fuel gas supply line adapted to supply a fuel gas to the fuel electrode (anode); a fuel gas recirculation line adapted to return an exhausted fuel gas discharged from the fuel electrode (anode) to the fuel electrode (anode); a cooler provided in the fuel gas recirculation line; and a control unit adapted to operate the cooler when the control unit has stopped the fuel cell and has cut the compressor and the second compressed oxidant supply line.

Therefore, when having cut the second compressed oxidant supply line and the second fuel gas supply line, and stopped the fuel cell, the control unit operates the cooler, so that the exhausted fuel gas circulating in the fuel gas recirculation line is cooled by the cooler, and the cooled exhausted fuel gas is introduced into and cools the fuel cell fuel cell. As a result, when stopping the fuel cell, the fuel cell can be promptly cooled.

Advantageously, in the power generation system, a recirculation blower is provided in the fuel gas recirculation line, and the control unit operates the cooler when the control unit has stopped the fuel cell.

Therefore, the exhausted fuel gas in the fuel gas recirculation line is forcibly circulated by the recirculation blower, and the exhausted fuel gas cooled by the cooler is effectively introduced into the fuel cell. As a result, the cooling efficiency of the fuel cell can be improved.

Advantageously, the power generation unit, a reductant supply line adapted to supply a reductantreductant to the fuel electrode (anode), and a discharge line adapted to discharge an exhausted fuel gas discharged from the fuel electrode (anode) to an outside are provided, and the control unit supplies a predetermined amount of the reductant to the fuel electrode (anode) through the reductant supply line and discharges the exhausted fuel gas from the fuel electrode (anode) to an outside through the discharged line, when the control unit has stopped the fuel cell.

Therefore, when the fuel cell is cooled by the cooler through the exhausted fuel gas, the reductant is supplied to the fuel electrode (anode), so that the oxidation of the fuel electrode (anode) can be prevented. In addition, the exhausted fuel gas is discharged to an outside through the discharge line, so that an increase in pressure of the fuel electrode (anode) can be prevented.

Advantageously, in the power generation system, a purge gas supply line adapted to supply a purge gas to the fuel electrode (anode) is provided, and when the temperature of the fuel cell is decreased to a predetermined temperature set in advance, the control unit stops suppling the reductant through the reductant supply line to the fuel cell, and supplies the purge gas through the purge gas supply line to the fuel cell.

In this case, when the temperature of the fuel cell is decreased to a predetermined temperature, all of the gas in the fuel electrode (anode) is replaced by a purge gas, so that deterioration of the fuel electrode (anode) is prevented while a chemically stable state can be maintained after the fuel cell is stopped. As the purge gas, an inert gas is exemplified. As the inert gas, nitrogen, a carbon dioxide gas, and the like can be considered.

Advantageously, in the power generation system, the cooler includes a heat exchanger.

Therefore, the structure of the cooler can be simplified.

Advantageously, in the power generation system, the cooler includes a spray nozzle or an ejector adapted to supply water to the fuel gas recirculation line.

Therefore, when water is supplied to the exhausted fuel gas flowing in the fuel gas recirculation line, the latent heat of vaporization occurs when the exhausted fuel gas evaporates water. Therefore the exhausted fuel gas can be effectively cooled. In the case of the ejector, the gas recirculation in the recirculation line is made by the water injected from the ejector. Therefore, the gas flow can be secured even if the recirculation blower is stopped.

Advantageously, in the power generation system, a third compressed oxidant supply line adapted to supply compressed oxidant to the second compressed oxidant supply line, and a discharge line adapted to discharge an exhausted oxidant discharged from the air electrode (cathode) to an outside are provided, and the control unit requests to supply the compressed oxidant through the third compressed oxidant supply line and discharges the exhausted oxidant through the discharge line when the control unit has requested to stop the fuel cell.

Therefore, when the fuel cell has been stopped, while the compressed oxidant is supplied to the air electrode (cathode), the exhausted oxidant in the inside is discharged, so that not only the fuel electrode (anode) but also the air electrode (cathode) can be cooled, and the fuel cell can be promptly cooled.

Advantageously, in the power generation system, the cooler includes a nozzle adapted to supply a mixed liquid of hydrophilic hydrocarbon and water to the fuel gas recirculation line.

Therefore, the mixed liquid of hydrophilic hydrocarbon and water is supplied to the fuel gas recirculation line, so that the fuel electrode (anode) is maintained to the reducing atmosphere and cooled while oxidation is prevented.

Advantageously, in the power generation system, the cooler supplies the mixed liquid to the fuel gas recirculation line by its own weight.

Therefore, the mixed liquid of hydrophilic hydrocarbon and water can be easily supplied without power supply from outside.

According to another aspect of the present invention, a method of stopping a power generation system includes: stopping supply of a compressed oxidant from a compressor of a gas turbine to a fuel cell; stopping supply of a fuel gas to a fuel electrode (anode) of the fuel cell; recirculating an exhausted fuel gas discharged from the fuel electrode (anode) to the fuel electrode (anode); and cooling the exhausted fuel gas discharged from the fuel electrode (anode).

Therefore, the exhausted fuel gas discharged from the fuel electrode (anode) is cooled, and the cooled exhausted fuel gas is introduced into and cools the fuel cell. As a result, the fuel cell can be promptly cooled when the fuel cell is stopped.

Advantageous Effects of Invention

According to the power generation system and the method of cooling a power generation system of the present invention, a cooler is provided in a fuel gas recirculation line, and when a second compressed oxidant supply line and a second fuel gas supply line are cut and the fuel cell is stopped, the cooler is operated. Therefore, the exhausted fuel gas circulating in the gas recirculation line is cooled by the cooler, and the fuel cell is cooled by the cooled exhausted fuel gas. As a result, the fuel cell can be promptly cooled.

DESCRIPTION OF EMBODIMENTS

Hereinafter, favorable embodiments of a power generation system and a method of stopping a power generation system according to the present invention will be described in detail with reference to the appended drawings. Note that the present invention is not limited to these embodiments, and if there is a plurality of embodiments, the present invention includes ones constituted by combinations of these embodiments.

First Embodiment

A power generation system of a first embodiment is a triple combined cycle (registered trademark) constituted by a combination of a solid oxide fuel cell (hereinafter, referred to as SOFC), a gas turbine, and a steam turbine. The triple combined system can realize extremely high generation efficiency by installation of the SOFC at an upstream side of a gas turbine combined cycle power generation (GTCC), thereby to take out electricity of the SOFC, the gas turbine, and the steam turbine in 3 stages. Note that, in the description below, a solid oxide fuel cell is applied as a fuel cell of the present invention and description will be given. However, the present invention is not limited to a fuel cell of this type.

Figure 1:
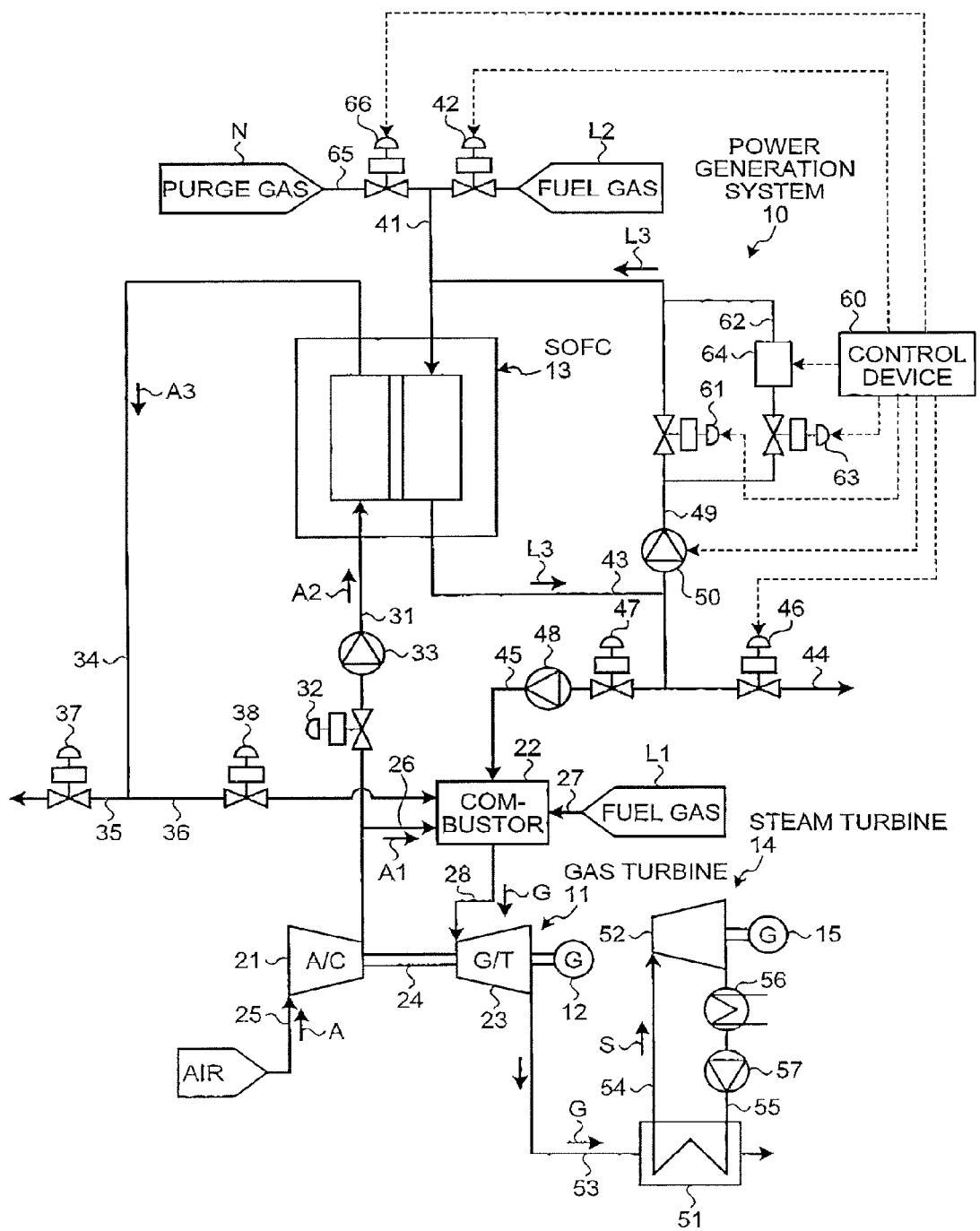
FIG. 1 is a schematic constitution diagram illustrating a power generation system according to a first embodiment of the present invention.
Figure 2:
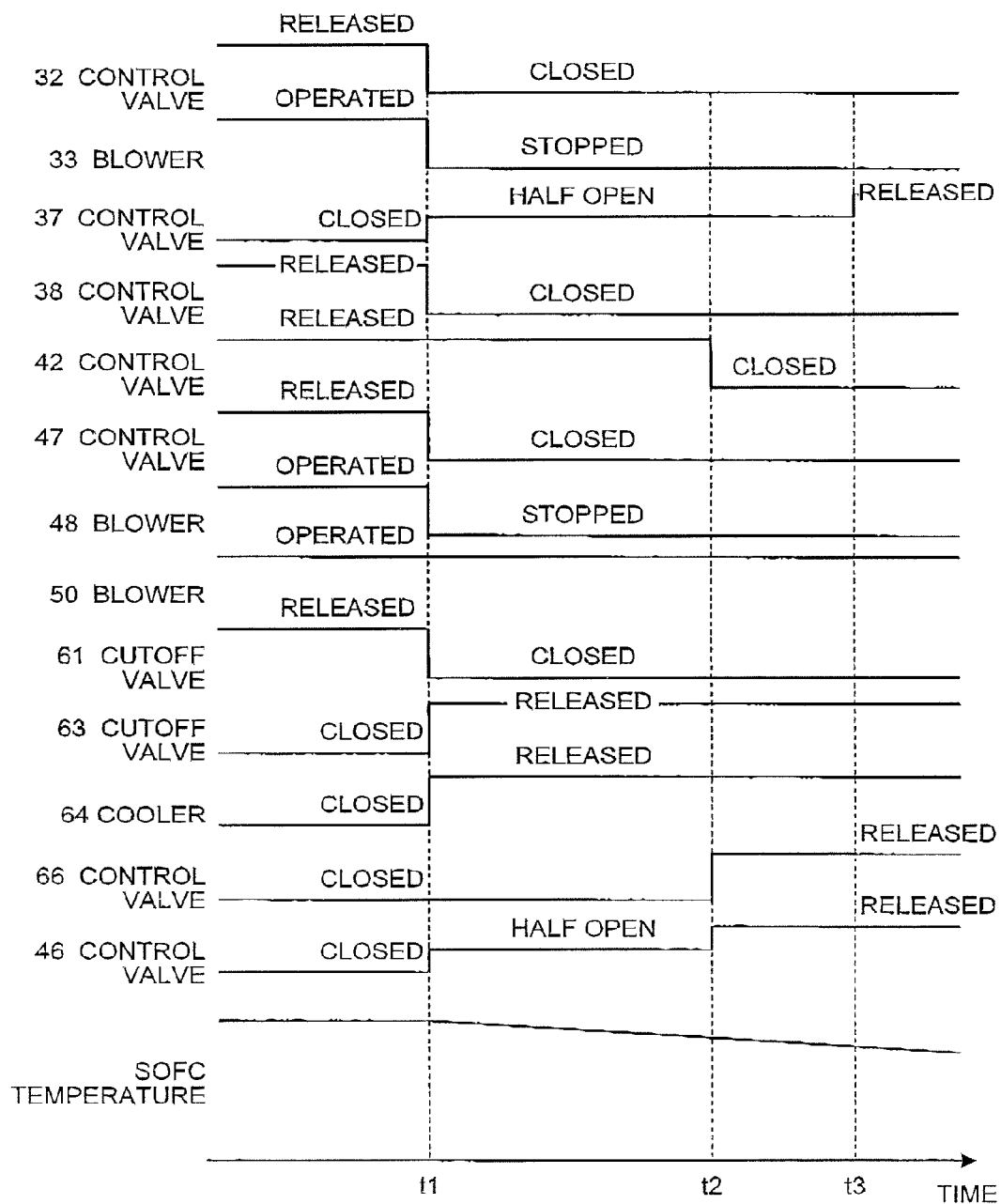
FIG. 2 is a time chart in the power generation system of the first embodiment.

FIG. 1 is a schematic constitution diagram illustrating a power generation system according to the first embodiment of the present invention, and FIG. 2 is a time chart during stopping in the power generation system of the first embodiment.

In the first embodiment, a power generation system 10 includes, as illustrated in FIG. 1, a gas turbine 11 and a power generator 12, an SOFC 13, and a steam turbine 14 and a power generator 15. This power generation system 10 is constituted to obtain high power generation efficiency by a combination of power generation by the gas turbine 11, power generation by the SOFC 13, and power generation by the steam turbine 14.

The gas turbine 11 includes a compressor 21, a combustor 22, and a turbine 23, and the compressor 21 and the turbine 23 are integrally and rotatably connected by a rotating shaft 24. The compressor 21 compresses air (oxidant) A taken out through an air take-in line 25. The combustor 22 mixes and combusts compressed air (compressed oxidant) A1 supplied from the compressor 21 through a first compressed air supply line (first compressed oxidant supply line) 26 and a fuel gas L1 supplied through a first fuel gas supply line 27. The turbine 23 is rotated by a flue gas (combustion gas) G supplied from the combustor 22 through a flue gas supply line 28. Although not illustrated, the turbine 23 is supplied the compressed air A1 compressed by the compressor 21 through a casing, and cools a blade using the compressed air A1 as cooling air. The power generator 12 is provided on the same axis as the turbine 23, and can generate power by rotation of the turbine 23. Note that, here, a liquefied natural gas (LNG), hydrogen ($H_2$), carbon monoxide (CO), a hydrocarbon gas such as methane ($CH_4$), or a gasified gas from carbonaceous raw material such as coal can be used as a fuel gas of the fuel gas L1 supplied to the combustor 22, a fuel gas L2, and a fuel gas L4 described below.

In the SOFC 13, when a high-temperature fuel gas as a reducing agent and high-temperature air (oxidant) as an oxidizing agent are supplied, the fuel gas and the air react with each other to generate power. The SOFC 13 is constituted by an air electrode (cathode), a solid electrolyte, and a fuel electrode (anode) accommodated in a pressure vessel. When a part of compressed air (compressed oxidant) A2 compressed by the compressor 21 is supplied to the air electrode (cathode), and the fuel gas L2 is supplied to the fuel electrode (anode), the SOFC 13 generates power. The oxidant supplied to the SOFC 13 contains approximately 15 to 30% oxygen, and typically, the air is favorable. Other than the air, a mixed gas of a combustion flue gas and the air, a mixed gas of oxygen and the air, or the like can be used (hereinafter, the oxidant supplied to the SOFC 13 is referred to as air).

A second compressed air supply line (second compressed oxidant supply line) 31 branching from the first compressed oxidant supply line 26 is coupled with the SOFC 13, and can supply a part of the compressed air A2 compressed by the compressor 21 to an introduction part of the air electrode (cathode). This second compressed air supply line 31 is provided with a control valve 32 capable of adjusting the air amount to be supplied, and a blower (pressure rising device) 33 capable of raising a pressure of the compressed air A2 along a flow direction of the air. The control valve 32 is provided at an upstream side of the flow direction in the air in the second compressed air supply line 31, and the blower 33 is provided at a downstream side of the control valve 32. Note that the arrangement of the control valve 32 and the blower (pressure rising device) 33 is not limited to the arrangement of FIG. 1, and the control valve 32 and the blower 33 may be arranged in a reversed order depending on the specification of the blower (pressure rising device) or the control valve. The SOFC 13 is coupled with an exhausted air line 34 that discharges exhausted air (exhausted oxidant) A3 used by the air electrode (cathode). This exhausted air line (exhausted oxidant line) 34 branches into a discharge line 35 that discharges the exhausted air A3 used by the air electrode (cathode) to outside, and into an exhausted oxidant supply line 36 coupled with the combustor 22. The discharge line 35 is provided with a control valve 37 capable of adjusting the air amount to be discharged, and the exhausted oxidant supply line 36 is provided with a cut-off valve 38 capable of adjusting the air amount to circulate.

In addition, the SOFC 13 is provided with a second fuel gas supply line 41 that supplies the fuel gas L2 to an introduction part of the fuel electrode (anode). The second fuel gas supply line 41 is provided with a control valve 42 capable of adjusting the fuel gas amount to be supplied. The SOFC 13 is coupled with an exhausted fuel line 43 that discharged an exhausted fuel gas L3 used by the fuel electrode (anode). This exhausted fuel line 43 branches into a discharge line 44 that discharges the exhausted fuel gas L3 to an outside, and into an exhausted fuel gas supply line 45 coupled with the combustor 22. The discharge line 44 is provided with a control valve 46 capable of adjusting the fuel gas amount to be exhausted, and the exhausted fuel gas supply line 45 is provided with a control valve 47 capable of adjusting the fuel gas amount to be supplied and a blower 48 capable of raising a pressure of the fuel along the flow direction of the exhausted fuel gas L3. The control valve 47 is provided at an upstream side in a flow direction of the exhausted fuel gas L3 in the exhausted fuel gas supply line 45, and the blower 48 is provided at a downstream side of the control valve 47 in a flow direction of the exhausted fuel gas L3. Note that the arrangement of the control valve 47 and the blower (pressure rising device) 48 is not limited to the arrangement of FIG. 1, and the control valve 47 and the blower 48 may be arranged in a reverse order depending on the specification of the blower (pressure rising device) or the control valve.

Further, the SOFC 13 is provided with a fuel gas recirculation line 49 that couples the exhausted fuel line 43 and the second fuel gas supply line 41. The fuel gas recirculation line 49 is provided with a recirculation blower (recirculation fan) 50 that recirculate the exhausted fuel gas L3 in the exhausted fuel line 43 to the second fuel gas supply line 41.

The steam turbine 14 rotates the turbine 52 by steam generated in a heat recovery steam generator (HRSG) 51. This heat recovery steam generator 51 is coupled with the flue gas line 53 from the gas turbine 11 (turbine 23), and performs heat exchange between the water and the high-temperature flue gas G to generate steam S. A steam supply line 54 and a feedwater line 55 are provided between the steam turbine 14 (turbine 52) and the heat recovery steam generator 51. The feedwater line 55 is provided with a condenser 56 and a feedwater pump 57. The power generator 15 is provided on the same axis as the turbine 52, and can generate power by rotation of the turbine 52. The flue gas G, from which heat has been collected in the heat recovery steam generator 51, is discharged into the atmosphere. Note that, in the present embodiment, the flue gas G is used as a heat source of the HRSG 51. However, the flue gas G can be used as a heat source of various devices other than the HRSG.

Here, an operation of the power generation system 10 of the first embodiment will be described. When the power generation system 10 is started, the steam turbine 14 and the SOFC 13 are started after the gas turbine 11 is started.

First, when the compressor 21 compresses the air A in the gas turbine 11, the combustor 22 mixes and combusts the compressed air A1 and the fuel gas L1, and the turbine 23 is rotated by the flue gas G, the power generator 12 starts to generate power. Next, in the steam turbine 14, the turbine 52 is rotated by the steam S generated by the heat recovery steam generator 51, whereby the power generator 15 starts to generate power.

The SOFC 13 is, first, supplied the compressed air A2 and starts to pressurize, and starts heating. The control valve 32 is released by a predetermined opening under a state in which the control valve 37 of the discharge line 35 and the cut-off valve 38 of the exhausted oxidant supply line 36 is closed, and the blower 33 of the second compressed air supply line 31 is stopped. A part of the compressed air A2 compressed by the compressor 21 is supplied through the second compressed air supply line 31 to the SOFC 13 side. Accordingly, the pressure of the SOFC 13 is increased by being supplied the compressed air A2.

Meanwhile, the SOFC 13 supplies the fuel gas L2, that is, compressed air (oxidant) from the branch of the compressed air line or an inert gas such as nitrogen to the fuel electrode (anode) side to start to pressurize. The control valve 42 of the second fuel gas supply line 41 is released and the recirculation blower 50 of the fuel gas recirculation line 49 is driven under a state in which the control valve 46 of the discharge line 44 and the control valve 47 of the exhausted fuel gas supply line 45 are closed, and the blower 48 is stopped. Note that the recirculation blower 50 may be started before the pressurization of the fuel electrode (anode) side. Then, the fuel gas L2 is supplied through the second fuel gas supply line 41 to the SOFC 13 side, and the exhausted fuel gas L3 is recirculated by the fuel gas recirculation line 49. Accordingly, when being supplied the fuel gas L2, air, the inert gas, and the like, the SOFC 13 side increases the pressure.

Then, the pressure at the air electrode (cathode) side of the SOFC 13 becomes an outlet pressure of the compressor 21, the control valve 32 is fully opened, and the blower 33 is driven if the blower 33 has not been started yet. Concurrently with that, the cut-off valve 38 is released, and the exhausted air A3 from the SOFC 13 is supplied to the combustor 22 through the exhausted oxidant supply line 36. At this time, the control valve 37 is also released and a part of the exhausted air A3 from the SOFC 13 may be discharged through the discharge line 35. The compressed air A2 is then supplied to the SOFC 13 side by the blower 33. Concurrently with that, the control valve 46 is released, and the exhausted fuel gas L3 from the SOFC 13 is discharged through the discharge line 44. When the pressure at the air electrode (cathode) side in the SOFC 13 and the pressure at the fuel electrode (anode) side reach a target pressure, the pressure rising of the SOFC 13 is completed.

Following that, when the pressure control of the SOFC 13 becomes stable, the control valve 37 is closed if open, and the cut-off valve 38 is released. Then, the exhausted air A3 from the SOFC 13 is supplied through the exhausted oxidant supply line 36 to the combustor 22. In addition, when the component of the exhausted fuel gas L3 becomes a component that can be put in the combustor, the control valve 46 is closed and the control valve 47 is released to drive the blower 48. Then, the exhausted fuel gas L3 from the SOFC 13 is supplied to the combustor 22 through the exhausted fuel gas supply line 45. At this time, the amount of the fuel gas L1 supplied through the first fuel gas supply line 27 to the combustor 22 is decreased.

Here, all of the power generation in the power generator 12 by driving of the gas turbine 11, the power generation in the SOFC 13, and the power generation in the power generator 15 by driving of the steam turbine 14 are performed, and the power generation system 10 comes into a stable operation.

By the way, when the gas turbine 11 supplies the compressed air A1 compressed by the compressor 21 and the fuel gas L1 to the combustor 22 in the power generation system, the combustor 22 mixes and combusts the compressed air A1 and the fuel gas L1, and the power generator 12 rotates the turbine 23 by the generated flue gas (combustion gas) G to generate power. Meanwhile, in the SOFC 13, a part of the compressed air A2 compressed by the compressor 21 and fuel gas L2 are supplied, and the compressed air A2 and the fuel gas L2 react with each other to generate power.

When the SOFC 13 is stopped under a state where the gas turbine 11 and the SOFC 13 are operated to generate power, the SOFC 13 is separated from the gas turbine 11, and the supply of the compressed air A2 from the compressor 21 is stopped. Therefore, it takes a long time to cool the SOFC 13. However, it is desirable to promptly cool the SOFC 13 in a high temperature area immediately after the SOFC 13 is stopped for the reasons of deterioration of the fuel electrode (anode) due to oxidation.

Therefore, in the power generation system 10 of the first embodiment, the fuel gas recirculation line 49 is provided with the cooler 64, and when the control device (control unit) 60 has cut the second compressed air supply line 31 and the second fuel gas supply line 41, and has stopped the SOFC 13, the control device 60 operates the cooler 64. Therefore, when the SOFC 13 is stopped, the exhausted fuel gas L3 that recirculates in the SOFC 13 through the fuel gas recirculation line 49 is cooled by the cooler 64, so that the SOFC 13 can be cooled by the cooled exhausted fuel gas L3, and the SOFC 13 can be promptly cooled.

In this case, since the recirculation blower 50 is provided in the fuel gas recirculation line 49, the control device 60 forcibly circulates the exhausted fuel gas L3 cooled by the cooler 64 in the SOFC 13 by operating the recirculation blower 50 when having stopped the SOFC 13, and can efficiently cool the SOFC 13.

To be specific, the fuel gas recirculation line 49 is provided with a cut-off valve 61 at a downstream side of the recirculation blower 50 in the flow direction of the exhausted fuel gas L3. Further, the fuel gas recirculation line 49 is provided with a fuel gas by-pass line 62 that by-passes the cut-off valve 61, and the fuel gas by-pass line 62 is provided with a cut-off valve 63, and a cooler 64 at a downstream side of the cut-off valve 63 in the flow direction of the exhausted fuel gas L3. The cooler 64 is a heat exchanger, in which cooling water piping (not illustrated) is arranged with cooling water flowing, the exhausted fuel gas L3 flowing in the fuel gas recirculation line 49 is cooled by being subjected to heat exchange with cooling water flowing in the cooling piping arranged in the cooler 64. Here, as the cooler 64, the exhausted fuel gas L3 can be cooled by heat exchange not only with the cooling water, but also with the air or other low-temperature medium.

Therefore, the control device 60 requests to release the cut-off valve 61 and closes the cut-off valve 63 at operation of the SOFC 13. Therefore, the exhausted fuel gas L3 discharged from the SOFC 13 can recirculate through the fuel gas recirculation line 49. Further, when having stopped the SOFC 13, the control device 60 closes the cut-off valve 61, and releases the cut-off valve 63. Therefore, the exhausted fuel gas L3 discharged from the SOFC 13 can recirculate through the fuel gas recirculation line 49 through the fuel gas by-pass line 62. At this time, the control device 60 can cool the exhausted fuel gas L3 by operating the cooler 64.

Further, a purge gas supply line 65 that supplies a purge gas N to the fuel electrode (anode) of the SOFC 13 is provided, and the purge gas supply line 65 is provided with a control valve 66. This purge gas N is desirably an inert gas, and is desirably nitrogen (N) or carbon dioxide, for example. When it is necessary to cause the fuel electrode (anode) side to be a reducing atmosphere because the temperature of the SOFC 13 is high when having stopped the SOFC 13, it is desirable that the control device 60 keeps the control valve 42 of the second fuel gas supply line 41 released in order to maintain the reducing atmosphere, and supplies the fuel gas L2 and water or steam (not illustrated). Following that, when the temperature of the SOFC 13 is decreased, and the temperature of the SOFC 13 is low enough to prevent from oxidation in the fuel electrode (anode) to some extent, the control device 60 supplies a predetermined amount of a purge gas N to the fuel electrode (anode) through the purge gas supply line 65 in place of the fuel gas L2. At this time, since a circulation path constituted by the SOFC 13 and the fuel gas recirculation line 49 is blocked, the pressure rises. Therefore, the control valve 46 is released by only a predetermined opening, or the pressure is controlled with the control valve 46, so that the exhausted fuel gas L3 having a similar amount to the supply amount of the purge gas N supplied through the purge gas supply line 65 to the fuel electrode (anode), or an amount slightly larger than the supply amount is discharged to an outside through the discharge line 44. In addition, when the exhausted fuel gas L3 having a slightly larger amount is discharged, pressure decrease is performed at the same time.

It is necessary for the SOFC 13 to maintain the pressure of the air electrode (cathode) and the pressure of the fuel electrode (anode) to a similar extent. Therefore, the control device 60 maintains the pressure of the air electrode (cathode) and the pressure of the fuel electrode (anode) by releasing the control valve 37 to discharge the exhausted air A3 at the air electrode (cathode) side through the discharge line 35 when releasing the control valve 46 to discharge the exhausted fuel gas at the fuel electrode (anode) side through the discharge line 44. In this case, it is favorable that a pressure sensor is provided to each of the air electrode (cathode) and the fuel electrode (anode), and the openings of the control valves 66, 46, and 37 are adjusted according to the pressure of the air electrode (cathode) and the pressure of the fuel electrode (anode) detected by the pressure sensors.

When the SOFC 13 is decreased in temperature to a predetermined temperature set in advance (for example, 400° C.), the control device 60 increases the opening of the control valve 66 to change the reductant to an inert gas by the purge gas supplied through the purge gas supply line 65. The reductant in the exhausted fuel gas L3 flowing in the SOFC 13 or in the fuel gas recirculation line 49 is discharged to outside, and is replaced by a chemically stable inert gas.

The method of stopping a power generation system of the first embodiment includes the steps of stopping supply of the compressed air A2 from the compressor 21 of the gas turbine 11 to the air electrode (cathode) of the SOFC 13, stopping supply of the fuel gas L2 to the fuel electrode (anode) of the SOFC 13, recirculating the exhausted fuel gas L3 discharged from the fuel electrode (anode) to the fuel electrode (anode), and cooling the exhausted fuel gas L3 discharged from the fuel electrode (anode).

Here, a method of stopping the power generation system of the first embodiment will be described in detail using the time chart of FIG. 2. Note that the control device 60 can control the control valves 32, 37, 42, 46, 47, and 66, the cut-off valves 38, 61, and 63, and the blowers 33, 48, and 50.

In a method of stopping the power generation system of the first embodiment, as illustrated in FIGS. 1 and 2, when the gas turbine 11 and the SOFC 13 are in an operating state, while the control valves 32, 42, and 47, and the cut-off valves 38 and 61 are released, the control valves 37, 46, and 66, and the cut-off valve 63 are closed, and the blowers 33, 48, and 50 are operated. Then, in the SOFC 13, while the compressed air A2 is supplied to the air electrode (cathode) through the second compressed air supply line 31, the fuel gas L2 is supplied to the fuel electrode (anode) through the second fuel gas supply line 41, and the compressed air A2 and the fuel gas L2 react with each other and the power generation is performed. Then, in the SOFC 13, while the exhausted air A3 is discharged from the air electrode (cathode) to the exhausted air line 34 and is supplied to the combustor 22 through the exhausted oxidant supply line, the exhausted fuel gas L3 is discharged from the fuel electrode (anode) to the exhausted fuel line 43, is supplied to the combustor 22 through the exhausted fuel gas supply line 45, and is returned to the fuel electrode (anode) through the fuel gas recirculation line 49.

Then, to stop the SOFC 13 at a time t1, while the control valves 32 and 47, and the cut-off valves 38 and 61 are closed, the control valves 37, 42, and 46, and the cut-off valve 63 are released (the control valves 37 and 46 are, for example, half open), the blowers 33 and 48 are stopped, and the cooler 64 is operated. Then, in the SOFC 13, while the supply of the compressed air A2 to the air electrode (cathode) is stopped, the supply of the fuel gas L2 to the fuel electrode (anode) is continued, and the power generation is stopped under a state in which the reducing atmosphere of the fuel electrode (anode) is maintained. In addition, in the SOFC 13, the exhausted fuel gas L3 discharged from the fuel electrode (anode) to the exhausted fuel line 43 circulates to the fuel electrode (anode) through the fuel gas recirculation line 49, and the exhausted fuel gas L3 is cooled by the cooler 64. Then, when the cooled exhausted fuel gas L3 is introduced to the fuel electrode (anode), the fuel electrode (anode) is cooled.

Further, at a time t2, when the SOFC 13 is cooled to a predetermined temperature set in advance, while the control valve 42 is closed, the control valves 66 and 46 are released. Further, in the SOFC 13, while the purge gas N is supplied through the purge gas supply line 65 to the fuel electrode (anode), the exhausted fuel gas L3 of the fuel gas recirculation line 49 is discharged through the discharge line 44 to the outside. Therefore, in the fuel electrode (anode), the reducing atmosphere is replaced by the inert atmosphere by the purge gas N in a short time, and cooling is maintained by the exhausted fuel gas L3 cooled by the cooler 64.

Following that, at time t3, the temperature of the SOFC 13 is further decreased by the maintenance of the cooling, and in the fuel electrode (anode), the reducing atmosphere is replaced by the inert atmosphere by the purge gas N. Therefore, soundness is maintained. Note that, here, the cooler 64 may be stopped.

As described above, the power generation system of the first embodiment is provided with the gas turbine 11 including the compressor 21 and the combustor 22, the SOFC 13 including the air electrode (cathode) and the fuel electrode (anode), the first compressed air gas supply line 26 that supplies the compressed air A1 compressed by the compressor 21 to the combustor 22, the second compressed air gas supply line 31 that supplies a part of the compressed air A2 compressed by the compressor 21 to the air electrode (cathode), the first fuel gas supply line 27 that supplies the fuel gas to the combustor 22, the second fuel gas supply line 41 that supplies the fuel gas to the fuel electrode (anode), the fuel gas recirculation line 49 that returns the exhausted fuel gas L3 discharged from the fuel electrode (anode) to the fuel electrode (anode), the cooler 64 provided in the fuel gas recirculation line 49, and the control device 60 that operates the cooler 64 when having cut the second compressed air supply line 31 and the second fuel gas supply line 41, and stopped the SOFC 13.

Therefore, when the supply of the compressed air and the fuel gas to the SOFC 13 is stopped and the SOFC 13 is stopped, the cooler 64 provided in the fuel gas recirculation line 49 is operated, so that the exhausted fuel gas L3 circulating in the fuel gas recirculation line 49 is cooled by the cooler 64, and the cooled exhausted fuel gas L3 is introduced to and cools the fuel electrode (anode) of the SOFC 13, whereby the SOFC 13 can be promptly cooled when being stopped.

The power generation system of the first embodiment is provided with the recirculation blower 50 in the fuel gas recirculation line 49, and the control device 60 operates the recirculation blower 50 when having stopped the SOFC 13. Therefore, the exhausted fuel gas L3 in the fuel gas recirculation line 49 is forcibly circulated by the recirculation blower 50, and the exhausted fuel gas L3 cooled by the cooler 64 is effectively introduced to the SOFC 13, whereby the cooling efficiency of the SOFC 13 can be improved.

The power generation system of the first embodiment is provided with the purge gas supply line 65 that supplies the purge gas N to the fuel electrode (anode), and the discharge line 44 that discharges the exhausted fuel gas L3 discharged from the fuel electrode (anode) to the outside, and when intending to stop the SOFC 13, the control device 60 supplies a predetermined amount of the purge gas to the fuel electrode (anode) through the purge gas supply line 65, and discharges the exhausted fuel gas L3 from the fuel electrode (anode) to the outside through the discharge line 44. Therefore, when the SOFC 13 is cooled by the cooler 64 through the exhausted fuel gas L3, the purge gas N is supplied to the fuel electrode (anode) in order to prevent the deterioration of the fuel electrode (anode) due to oxidation. Further, the exhausted fuel gas L3 is discharged to the outside through the discharge line 44, whereby an increase in pressure of the fuel electrode (anode) can be prevented.

In the power generation system of the first embodiment, when the temperature of the SOFC 13 is decreased to a predetermined temperature set in advance, the control device 60 supplies the purge gas through the purge gas supply line 65, and replaces all of the exhausted fuel gas L3 in the fuel electrode (anode) by the inert atmosphere by the purge gas N, whereby the deterioration of the fuel electrode (anode) can be prevented.

The power generation system of the first embodiment uses the cooler 64 as a heat exchanger. Therefore, the structure of the cooler 64 can be simplified.

Further, the method of stopping the power generation system of the first embodiment includes a step of stopping the supply of the compressed air A2 from the compressor 21 of the gas turbine 11 to the air electrode (cathode) of the SOFC 13, a step of stopping the supply of the fuel gas L2 to the fuel electrode (anode) of the SOFC 13, a step of recirculating the exhausted fuel gas L3 discharged from the fuel electrode (anode) to the fuel electrode (anode), and a step of cooling the exhausted fuel gas L3 discharged from the fuel electrode (anode).

Therefore, when the exhausted fuel gas L3 discharged from the fuel electrode (anode) is cooled, the cooled exhausted fuel gas L3 is introduced to and cools the SOFC 13, accordingly, whereby the SOFC 13 can be promptly cooled when being stopped.

Second Embodiment

Figure 3:
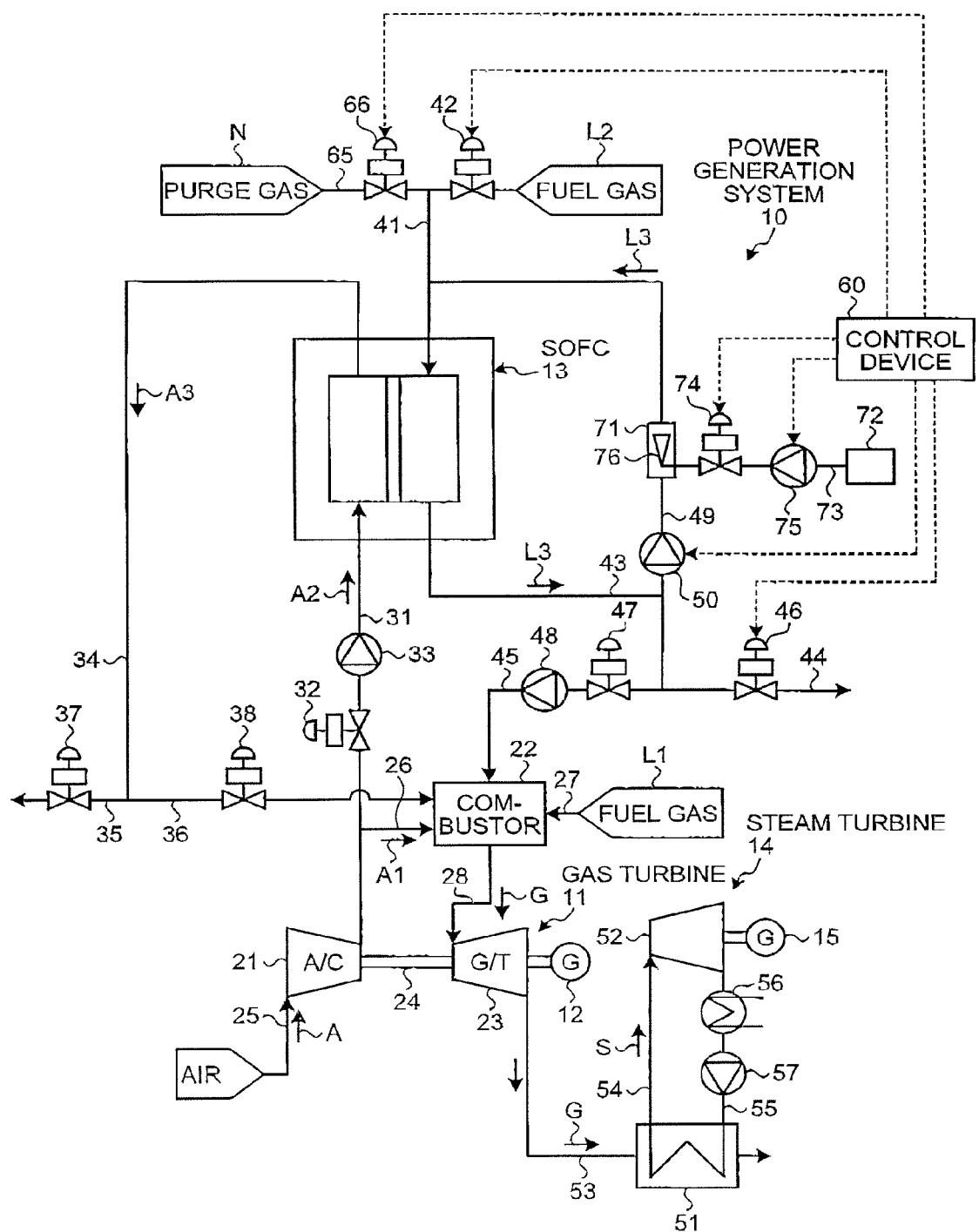
FIG. 3 is a schematic constitution diagram illustrating a power generation system according to a second embodiment of the present invention.

FIG. 3 is a schematic constitution diagram illustrating a power generation system according to a second embodiment of the present invention. Note that a member having a similar function to the above-described embodiment is denoted with the same reference sign and detailed description is omitted.

A power generation system 10 of the second embodiment is provided with a cooler 71 in a fuel gas recirculation line 49, as illustrated in FIG. 3, and when having stopped an SOFC 13 by cutting a second compressed air supply line 31 and a second fuel gas supply line 41, a control device 60 operates the cooler 71. Therefore, when the SOFC 13 has been stopped, an exhausted fuel gas L3 circulating in the SOFC 13 through the fuel gas recirculation line 49 is cooled by the cooler 71, so that the SOFC 13 can be cooled by the cooled exhausted fuel gas L3, and the SOFC 13 can be promptly cooled.

In this case, since a recirculation blower 50 is provided in the fuel gas recirculation line 49, the control device 60 forcibly circulate the exhausted fuel gas L3 cooled by the cooler 71 by operating the recirculation blower 50 when having stopped the SOFC 13, thereby to efficiently cool the SOFC 13.

To be specific, the fuel gas recirculation line 49 is provided with the cooler 71 at a downstream side of the recirculation blower 50 in a flow direction of the exhausted fuel gas L3. A storage tank 72 capable of storing water is coupled with a base end part of a water supply line 73. The water supply line 73 is provided with a control valve 74 and a pump 75, and a tip end part thereof is extended to the cooler 71 and is provided with a spray nozzle 76. The spray nozzle 76 can spray water toward the downstream side in the flow direction of the fuel gas L3 in the fuel gas recirculation line 49. Note that, when adjustment of a flow rate is not necessary, the control valve 74 can be used as a cut-off valve or a check valve.

Therefore, when stopping the SOFC 13, the control device 60 sends water in the storage tank 72 to the spray nozzle 76 through water supply line 73 by releasing the control valve 74 and operating the pump 75 in the cooler 71, and injects water from the spray nozzle 76 toward the exhausted fuel gas L3 flowing in the fuel gas recirculation line 49. Then, when the injected water is vaporized by the high-temperature exhausted fuel gas L3, the exhausted fuel gas L3 can be cooled by occurrence of latent heat of the vaporization.

The power generation system of the second embodiment is provided with a spray nozzle 76 that supplies water to the fuel gas recirculation line 49 as the cooler 71. Therefore, when water is supplied to the exhausted fuel gas L3 flowing in the fuel gas recirculation line 49 by the spray nozzle 76, the latent heat of vaporization occurs when the exhausted fuel gas L3 evaporates water. Therefore the exhausted fuel gas L3 can be effectively cooled. Instead of water, by use of a fluid mixture of water and hydrophilic hydrocarbon, it maintains or keeps the reducing atmosphere in addition to the cooling.

Third Embodiment

Figure 4:
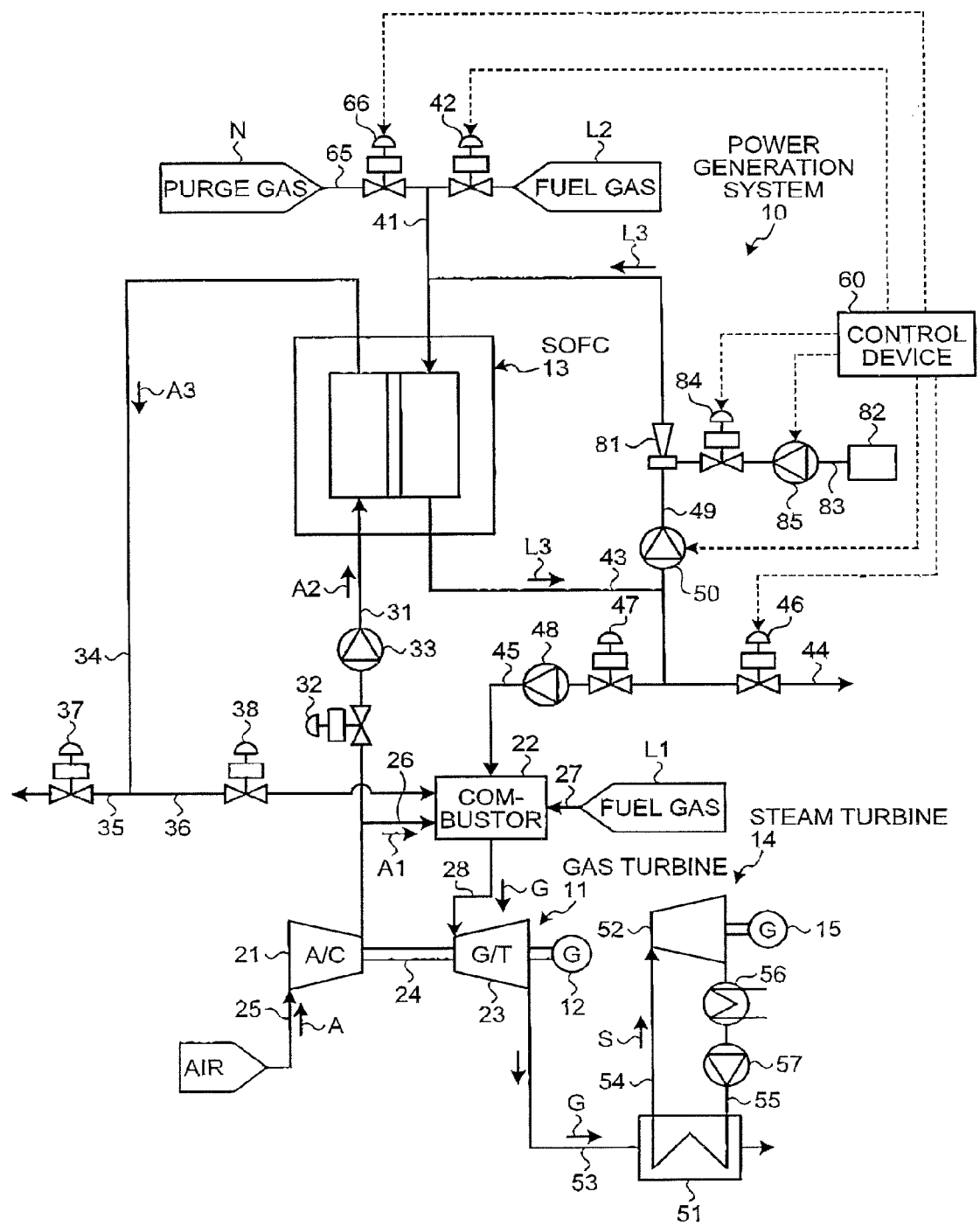
FIG. 4 is a schematic constitution diagram illustrating a power generation system according to a third embodiment of the present invention.

FIG. 4 is a schematic constitution diagram illustrating a power generation system according to a third embodiment of the present invention. Note that a member having a similar function to the above-described embodiment is denoted with the same reference sign and detailed description is omitted.

A power generation system 10 of the third embodiment is, as illustrated in FIG. 4, provided with a cooler 81 in a fuel gas recirculation line 49, a control device 60 operates the cooler 81 when cutting a second compressed air supply line 31 and a second fuel gas supply line 41 to stop an SOFC 13. Therefore, when the SOFC 13 has been stopped, the exhausted fuel gas L3 circulating in the SOFC 13 through the fuel gas recirculation line 49 is cooled by the cooler 81, so that the SOFC 13 is cooled by the cooled exhausted fuel gas L3, and the SOFC 13 can be promptly cooled.

To be specific, the fuel gas recirculation line 49 is provided with the cooler 81 at a downstream side of a recirculation blower 50 in a flow direction of the exhausted fuel gas L3. A storage tank 82 capable of storing water is coupled with a base end part of a water supply line 83, and water supply line 83 is provided with a control valve 84 and a pump 85, and a cooler 81 in a tip end part. The cooler 81 is an ejector, and can inject water toward the downstream side in the flow direction of the fuel gas L3 in the fuel gas recirculation line 49.

Therefore, when stopping the SOFC 13, the control device 60 sends water in the storage tank 82 to the cooler (ejector) 81 through the water supply line 83 by releasing the control valve 84 and the operating the pump 85 in the cooler 81, and injects water from the cooler 81 toward the fuel gas recirculation line 49. Then, the injected water is injected toward the flow direction of the fuel gas L3, thereby to lead the exhausted fuel gas L3 in the fuel gas recirculation line 49 to the flow direction. At this time, when water is vaporized by the high-temperature exhausted fuel gas L3, the exhausted fuel gas can be cooled by occurrence of latent heat of the vaporization.

In this case, the fuel gas recirculation line 49 is provided with the recirculation blower 50, and water injected from the cooler 81 toward the fuel gas recirculation line 49 forms a flow of the fuel gas L3 in the fuel gas recirculation line 49. Therefore, when having stopped the SOFC 13, the control device 60 can forcibly circulate the exhausted fuel gas L3 cooled by the cooler 81 in the SOFC 13 without operating the recirculation blower 50, thereby to efficiently cool the SOFC 13.

As described above, the power generation system of the third embodiment is provided with an injector that supplies water to the fuel gas recirculation line 49 as the cooler 81. Therefore, when water is supplied by the cooler (ejector) 81 toward the flow direction of the exhausted fuel gas L3 in the fuel gas recirculation line 49 cooler (ejector) 81, the latent heat of vaporization occurs when the exhausted fuel gas L3 evaporates water. Therefore, the exhausted fuel gas L3 can be effectively cooled. Further, water flow from the cooler (ejector) 81 forms a flow of the exhausted fuel gas L3 in the fuel gas recirculation line 49. Therefore, recirculation blower 50 does not need to be operated, and the required power can be reduced.

Fourth Embodiment

Figure 5:
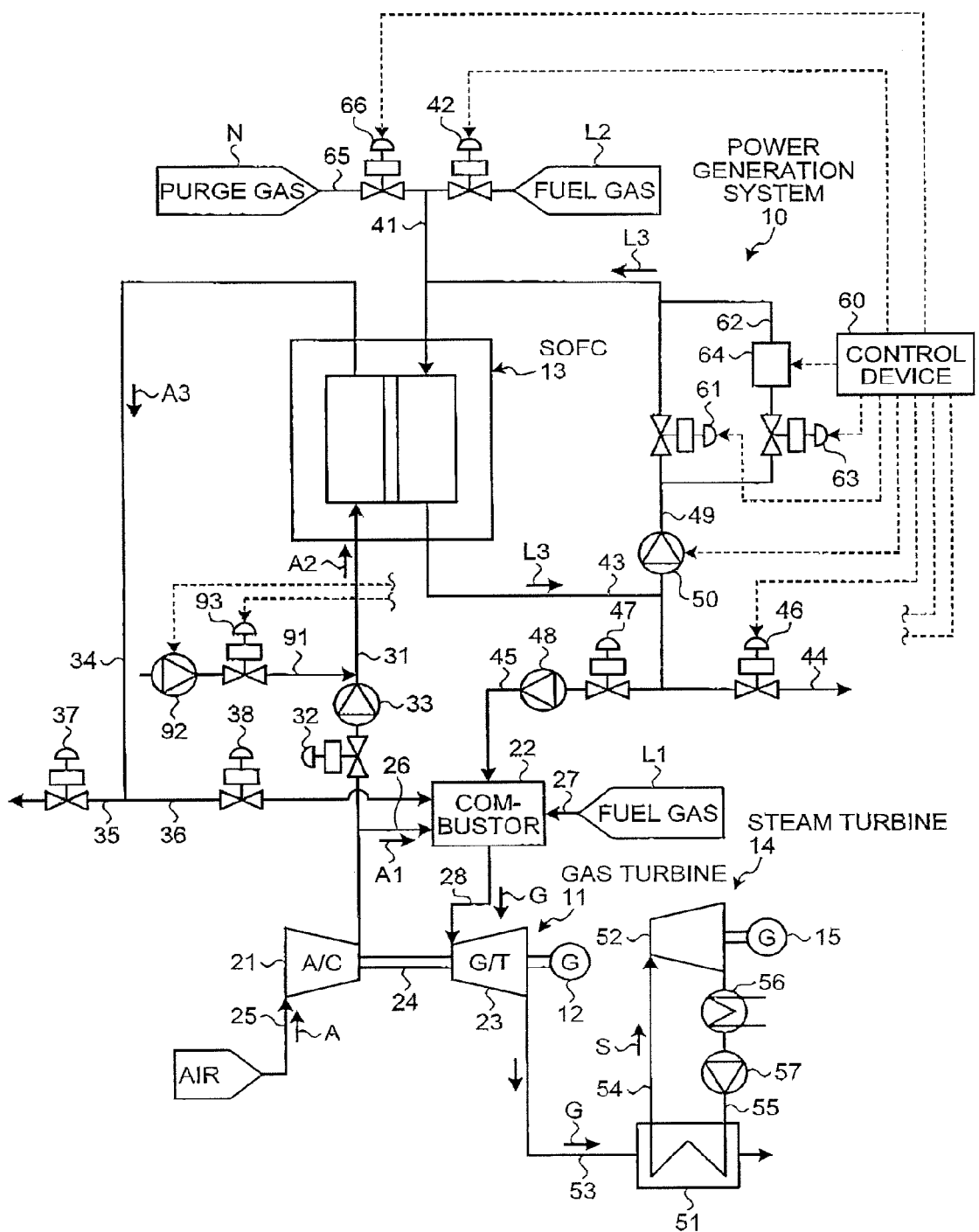
FIG. 5 is a schematic constitution diagram illustrating a power generation system according to a fourth embodiment of the present invention.

FIG. 5 is a schematic constitution diagram illustrating a power generation system according to a fourth embodiment of the present invention. Note that a member having a similar function to the above-described embodiment is denoted with the same reference sign and detailed description is omitted.

A power generation system 10 of the fourth embodiment is, as illustrated in FIG. 5, provided with a cooler 64 in a fuel gas recirculation line 49, and a control device 60 operates the cooler 64 when having cut a second compressed air supply line 31 and a second fuel gas supply line 41 and stopped an SOFC 13. Therefore, when the SOFC 13 is stopped, an exhausted fuel gas L3 circulating in the SOFC 13 through the fuel gas recirculation line 49 can be cooled by the cooler 64, so that the SOFC 13 can be cooled by the cooled exhausted fuel gas L3, and the SOFC 13 can be promptly cooled.

To be specific, the fuel gas recirculation line 49 is provided with a cut-off valve 61 at a downstream side of a recirculation blower 50 in a flow direction of the exhausted fuel gas L3. In addition, the fuel gas recirculation line 49 is provided with a fuel gas by-pass line 62 that by-passes the cut-off valve 61, and the fuel gas by-pass line 62 is provided with a cut-off valve 63, and the cooler 64 at a downstream side of the cut-off valve 63 in the flow direction of the exhausted fuel gas L3. This cooler 64 is a heat exchanger.

Further, a second compressed air supply line 31 is coupled with a third compressed gas supply line 91 at a downstream side of a blower 33 in a flow direction of a compressed air A2, and the third compressed gas supply line 91 is provided with a control valve 93 and a blower 92. Note that, when adjustment of a flow rate is not necessary, the control valve 93 can be used as a cut-off valve.

Therefore, when having stopped the SOFC 13, the control device 60 closes the cut-off valve 61 and releases the cut-off valve 63. Therefore, the exhausted fuel gas L3 discharged from the SOFC 13 can recirculate through the fuel gas recirculation line 49 through the fuel gas by-pass line 62. At this time, the exhausted fuel gas L3 can be cooled by the operation of the cooler 64, and a fuel electrode (anode) of the SOFC 13 can be cooled by the cooled exhausted fuel gas L3. In addition, the control device 60 releases the control valve 93 to operate the blower 92, and releases a control valve 37. Then, while compressed air is supplied through the third compressed gas supply line 91 to the second compressed air supply line 31, exhausted air is discharged through a discharge line 35 to an outside. Therefore, the air is supplied to the SOFC 13 from the outside, and can cool the air electrode (cathode).

As described above, the power generation system of the fourth embodiment is provided with the third compressed air supply line 91 that supplies the compressed air to the second compressed air supply line 31, and the discharge line 35 that discharges the exhausted air discharged from the air electrode (cathode), and when having stopped the SOFC 13, the control device 60 supplies the compressed air by the third compressed air supply line 91, and discharges the exhausted air to the outside through the discharge line 35.

Therefore, when the SOFC 13 is stopped, the compressed air is supplied to the air electrode (cathode) and the exhausted air is discharged, so that not only the fuel electrode (anode) but also the air electrode (cathode) can be cooled, and the SOFC 13 can be promptly cooled. Note that, when the supply of an oxidant through the third compressed oxidant supply line is limited only after the SOFC is decompressed, the pressurization range of the rising pressure blower can be reduced, and the system can be reasonably structured.

Fifth Embodiment

Figure 6:
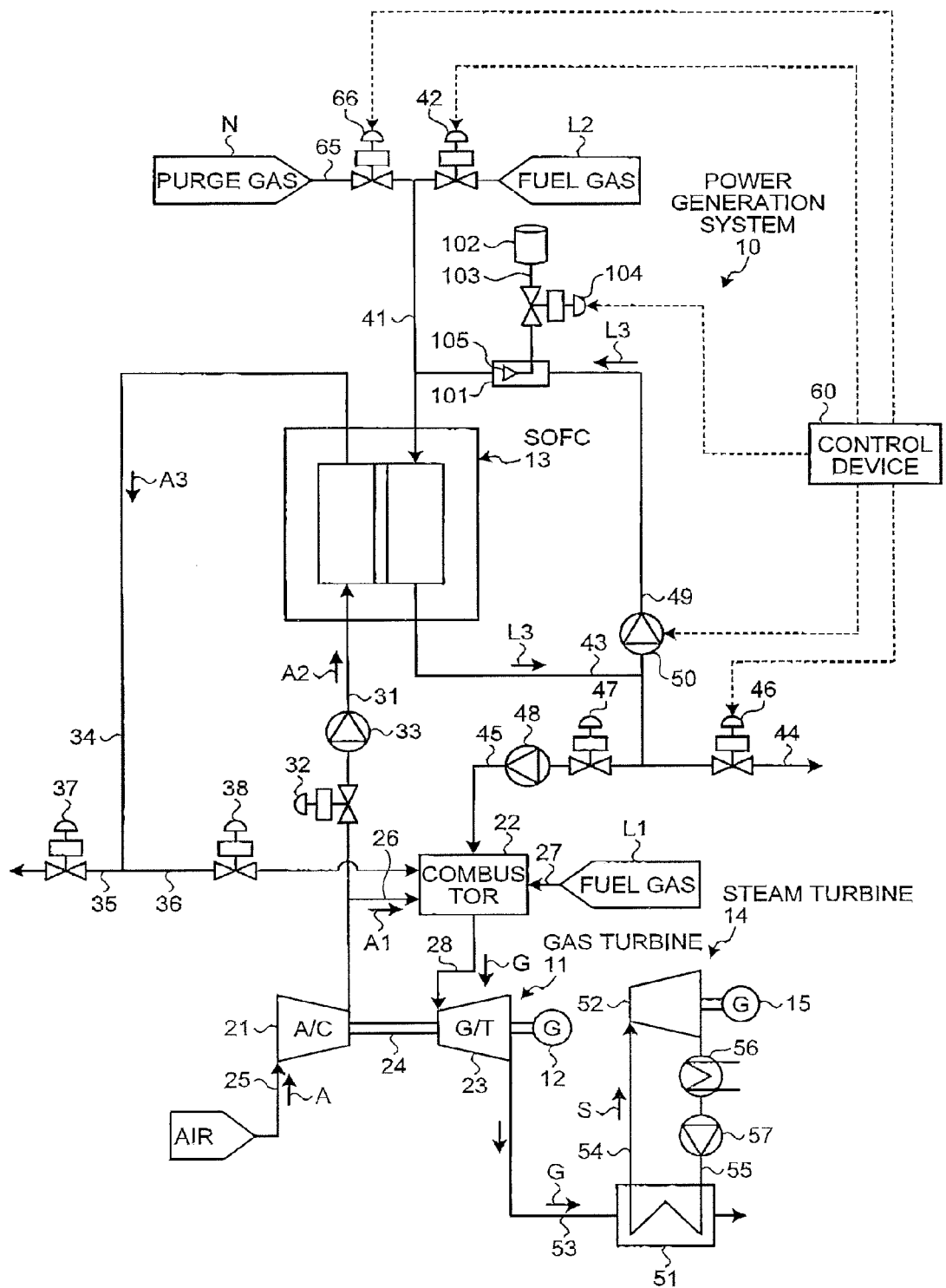
FIG. 6 is a schematic constitution diagram illustrating a power generation system according to a fifth embodiment of the present invention.

FIG. 6 is a schematic constitution diagram a power generation system according to a fifth embodiment of the present invention. Note that a member having a similar function to the above-described embodiment is denoted with the same reference sign and detailed description is omitted.

A power generation system 10 of the fifth embodiment is, as illustrated in FIG. 6, provided with a cooler 101 in a fuel gas recirculation line 49, and a control device 60 operates the cooler 101 when cutting a second compressed air supply line 31 and a second fuel gas supply line 41 to stop an SOFC 13. Therefore, when the SOFC 13 is stopped, an exhausted fuel gas L3 circulating on the SOFC 13 through the fuel gas recirculation line 49 can be cooled by the cooler 101, so that the SOFC 13 can be cooled by the cooled exhausted fuel gas L3, and the SOFC 13 can be promptly cooled.

In this case, since the fuel gas recirculation line 49 is provided with a recirculation blower 50, the control device 60 forcibly circulate the exhausted fuel gas L3 cooled by the cooler 101 in the SOFC 13 by operating the recirculation blower 50 when having stopped the SOFC 13, thereby to efficiently cool the SOFC 13.

To be specific, the fuel gas recirculation line 49 is provided with the cooler 101 at a downstream side of the recirculation blower 50 in a flow direction of the exhausted fuel gas. A storage tank 102 capable of storing a mixed liquid of hydrophilic hydrocarbon and water is coupled with a base end part of a solution supply line 103. The solution supply line 103 is provided with a control valve 104, and tip end part thereof is extended to the cooler 101 and is provided with a spray nozzle 105. The spray nozzle 105 can spray the solution toward the downstream side of the flue gas L3 in the fuel gas recirculation line 49. Note that, when adjustment of a low rate is not necessary, the control valve 104 can be used as a cut-off valve.

In this case, the hydrophilic hydrocarbon is methanol or ethanol and so on, and is mixed with water such that the weight ratio between the hydrophilic hydrocarbon and water is about one-to-one to one-to-three. Further, the storage tank 102 is arranged above a fuel gas recirculation line 49, and the stored solution can be sprayed from the spray nozzle 105 through the solution supply line 103 by own weight (natural drop).

Therefore, when stopping the SOFC 13, the control device 60 sends water in the storage tank 102 to the spray nozzle 105 through the solution supply line 103 by releasing the control valve 104 in the cooler 101, and sprays the solution from the spray nozzle 105 toward the exhausted fuel gas L3 flowing in the fuel gas recirculation line 49. Then, when the sprayed solution (hydrophilic hydrocarbon and water) are vaporized by the high-temperature exhausted fuel gas L3, the exhausted fuel gas L3 can be cooled by occurrence of latent heat of the vaporization.

Further, when the solution (hydrophilic hydrocarbon and water) is introduced to the fuel electrode (anode), the solution is reformed and hydrogen is generated, so that the fuel electrode (anode) is maintained to the reducing atmosphere. Therefore, the oxidation of the fuel electrode (anode) can be prevented.

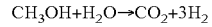

Note that, here, the storage tank 102 is arranged above the fuel gas recirculation line 49, and the solution is sprayed from the spray nozzle 105 by its own weight. However, the present embodiment is not limited to this constitution. For example, the solution may be pressurized and sent by a pump, an inert gas (for example, nitrogen) is pressurized and filled in a tank and the solution may be pressurized and sent by the gas, or the solution may be supplied by an ejector. Further, water is used as the fluid to be sprayed by its own weight, and a fuel gas is separately supplied, so that the reducing atmosphere may be maintained.

As described above, the power generation system of the fifth embodiment is provided with the spray nozzle 105 that supplies a mixed liquid of hydrophilic hydrocarbon and water in the fuel gas recirculation line 49 as the cooler 101.

Therefore, when the mixed liquid of hydrophilic hydrocarbon and water is supplied to the fuel gas recirculation line 49, the solution is reformed on the fuel electrode (anode) and hydrogen is generated, and the reducing atmosphere can be maintained. Further, the solution is vaporized by the high-temperature exhausted fuel gas L3, and the exhausted fuel gas L3 can be cooled by occurrence of latent heat of the vaporization, and the fuel electrode (anode) can be cooled.

Note that, in the above-described embodiment, the exhausted fuel gas supply line 45 is coupled with the exhausted fuel line 43 from the fuel electrode (anode) of the SOFC 13, and the exhausted fuel line 43 and the second fuel gas supply line 41 are coupled by the fuel gas recirculation line 49. However, the embodiment is not limited to this constitution. For example, the exhausted fuel line 43 and the second fuel gas supply line 41 may be coupled by the fuel gas recirculation line 49, and the exhausted fuel gas supply line 45 may be coupled with a downstream side of the recirculation blower 50 in the flow direction of the exhausted fuel gas L3 in the fuel gas recirculation line 49.

REFERENCE SIGNS LIST

10 Power generation system
11 Gas turbine
12 Power generator
13 Solid oxide fuel cell (SOFC)
14 Steam turbine
15 Power generator
21 Compressor
22 Combustor
23 Turbine
26 First compressed air supply line (first compressed oxidant supply line)
27 First fuel gas supply line
31 Second compressed air supply line (second compressed oxidant supply line)
32 Control valve
33 Blower
35 Discharge line
36 Exhausted oxidant supply line
37 Control valve 38 Cut-off valve
41 Second fuel gas supply line
42 Control valve
44 Discharge line
45 Exhausted fuel gas supply line
46 Control valve
47 Control valve
48 Blower
49 Fuel gas recirculation line
50 Recirculation blower (recirculation fan)
60 Control device (control unit)
64, 71, 81, and 101 Cooler
91 Third compressed air supply line (third compressed oxidant supply line)

The invention claimed is:

1. A power generation system comprising:
a gas turbine including a compressor and a combustor;
a fuel cell including an cathode and a anode;
a first compressed oxidant supply line adapted to supply a compressed oxidant compressed by the compressor to the combustor;
a second compressed oxidant supply line adapted to supply a part of the compressed oxidant compressed by the compressor to the cathode;
a first fuel gas supply line adapted to supply a fuel gas to the combustor;
a second fuel gas supply line adapted to supply a fuel gas to the anode;
a fuel gas recirculation line adapted to return an exhausted fuel gas discharged from the anode to the anode;
a cooler provided in the fuel gas recirculation line; and
a control unit adapted to operate the cooler when the control unit has stopped the fuel cell and has cut the compressor and the second compressed oxidant supply line, wherein
a reductant supply line adapted to supply a reductant to the anode, and a discharge line adapted to discharge an exhausted fuel gas discharged from the anode to an outside are provided, and the control unit supplies a predetermined amount of the reductant to the anode through the reductant supply line and discharges the exhausted fuel gas from the anode to the outside through a discharged line, at the same time as the control unit causes a fuel cell stop, and
a purge gas supply line adapted to supply a purge gas to the anode is provided, and when the temperature of the fuel cell is decreased to a predetermined temperature set in advance, the control unit stops supplying the reductant through the reductant supply line to the fuel cell, and supplies the purge gas through the purge gas supply line to the fuel cell.

2. The power generation system according to claim 1, wherein a recirculation blower is provided in the fuel gas recirculation line, and the control unit operates the cooler at the same time as the control unit causes the fuel cell stop.

3. The power generation system according to claim 1, wherein the cooler includes a heat exchanger.

4. The power generation system according to claim 1, wherein the cooler includes a spray nozzle or an ejector adapted to supply water to the fuel gas recirculation line.

5. The power generation system according to claim 1, wherein a third compressed oxidant supply line adapted to supply compressed oxidant to the second compressed oxidant supply line, and a discharge line adapted to discharge an exhausted oxidant discharged from the cathode to outside are provided, and the control unit requests to supply the compressed oxidant through the third compressed oxidant supply line and discharges the exhausted oxidant to outside through the discharge line at the same time as the control unit causes the fuel cell stop.

6. A method of stopping the power generation system of claim 1, the method comprising:
stopping supply of the compressed oxidant from the compressor of the gas turbine to the fuel cell;
stopping supply of the fuel gas to the anode of the fuel cell;
recirculating the exhausted fuel gas discharged from the anode to the anode; and
cooling the exhausted fuel gas discharged from the anode.

7. A power generation system comprising:
a gas turbine including a compressor and a combustor;
a fuel cell including an cathode and an anode;
a first compressed oxidant supply line adapted to supply a compressed oxidant compressed by the compressor to the combustor;
a second compressed oxidant supply line adapted to supply a part of the compressed oxidant compressed by the compressor to the cathode;
a first fuel gas supply line adapted to supply a fuel gas to the combustor;
a second fuel gas supply line adapted to supply a fuel gas to the anode;
a fuel gas recirculation line adapted to return an exhausted fuel gas discharged from the anode to the anode;
a cooler provided in the fuel gas recirculation line; and
a control unit adapted to operate the cooler when the control unit has stopped the fuel cell and has cut the compressor and the second compressed oxidant supply line,
wherein the cooler includes a nozzle adapted to supply a mixed liquid of hydrophilic hydrocarbon and water to the fuel gas recirculation line.

8. The power generation system according to claim 7, wherein the cooler supplies the mixed liquid to the fuel gas recirculation line by a potential energy of the mixed liquid.

* * * * *